United States Patent

[11] 3,582,563

[72] Inventor William Donald Cragg
Harlow, England

[21] Appl. No. 693,278
[22] Filed Dec. 26, 1967
[45] Patented June 1, 1971
[73] Assignee International Standard Electric Corporation
New York, N.Y.
[32] Priority Jan. 4, 1967
[33] Great Britain
[31] 551/67

[54] APPARATUS FOR MATCHING THE IMPEDANCE OF A TELEPHONE SET TO A LINE
2 Claims, 8 Drawing Figs.

[52] U.S. Cl. .......... 179/81
[51] Int. Cl. .......... H04n 1/00
[50] Field of Search .......... 179/81, 81 A, 81 B, 16.5

[56] References Cited

UNITED STATES PATENTS

| | | | |
|---|---|---|---|
| 2,629,783 | 2/1953 | Hopkins | 179/81(A) |
| 2,645,681 | 7/1953 | Green | 179/81 (A) |
| 2,818,470 | 12/1957 | Busala et al | 179/81 (A) |
| 3,251,951 | 5/1966 | Meewezen | 179/81 |
| 3,406,262 | 10/1968 | Grandstaff | 179/84 |

OTHER REFERENCES

" Unifets as Voltage-Controlled Resistors" ; Siliconix incorporated; 1963.

*Primary Examiner*—Kathleen H. Claffy
*Assistant Examiner*—William A. Helvestine
*Attorneys*—C. Cornell Remsen, Jr., Rayson P. Morris, Percy P. Lantzy, J. Warren Whitesel, Phillip A. Weiss and Delbert P. Warner

ABSTRACT: A telephone set is connected to a line via a variable resistance Line current is used to provide a control signal which adjusts the variable resistance in a manner that matches the impedance of the line. Three embodiments are disclosed using a transistor buffer, a photoresistor, and a thin film device.

APPARATUS FOR MATCHING THE IMPEDANCE OF A TELEPHONE SET TO A LINE

The present invention relates to the regulation of subscriber's telephone sets.

According to the invention there is provided an arrangement wherein a telephone subset is connected to the line via a configuration which includes a variable resistance, the impedance of the line being arranged to be matched with the impedance of the subset by deriving a control signal from the line current and applying the control signal so as to alter the value of the variable resistance.

In a first preferred embodiment, the receiver of the subset is isolated from the line by a common-base connected transistor and the control signal derived from the line current is arranged to alter the resistance of a variable resistance device in the base lead of the transistor.

The variable resistance device may be a photoresistor the value of whose resistance is altered by incident light from a lamp driven by the derived control signal.

In a second preferred embodiment variable resistance devices whose value is altered by the derived signal are included in the arms of the subset.

In a third preferred embodiment the series resistances of a ladder network which includes shunt capacities constitute the variable resistance, the variable resistances being formed by conducting layers (for example in field effect transistors) whose resistance is altered by application of an electrostatic field, the field being controlled by the signal derived from the line.

The invention also resides in a method of matching the impedance of a subset with that of the line by deriving a control signal from the line and applying the signal so derived so as to alter a variable resistance between the subset and the line.

The above-mentioned and other features of the invention will become more apparent and the invention itself will best be understood by reference to the following description taken in conjunction with the accompanying drawings, in which.

Ideally a local telephone line should be terminated in its characteristic impedance by the subset. As existing subsets have a positive reactive component in their input impedances and as local lines have a negative reactive component in their characteristic impedance, mismatch arises which is a prolific source of echo, indicated by low return loss.

One method of improving the matching is the use of a moving coil receiver in place of the moving iron receiver, since the former has less positive reactance than the latter. Return losses have been increased by about 4 db. on the average, say from about 8 db. to about 12 db. Still further improvement is desirable, and the objective should be at least 20 db. This will require a change from positive to negative reactance in the impedance of the receiver.

Figure 1:
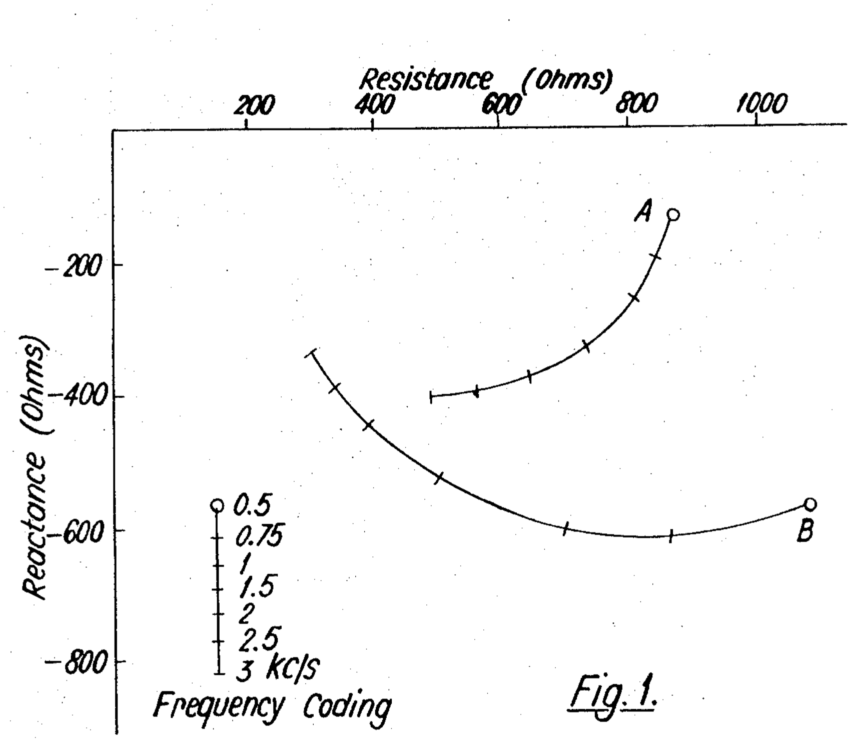
FIG. 1 shows the variation of impedance with frequency for different lengths of cable terminated in 600 ohms.

FIG. 1 shows the impedances in the form of a resistance-reactance curve of a two typical local telephone lines as seen by the receiver. The wires are of 24 American Wire Gauge, A being 1.6 kilometers in length and B 4.8 kilometers. The frequency coding is illustrated in FIG. 1, frequency decreasing towards the end marked by a circle.

Figure 2:
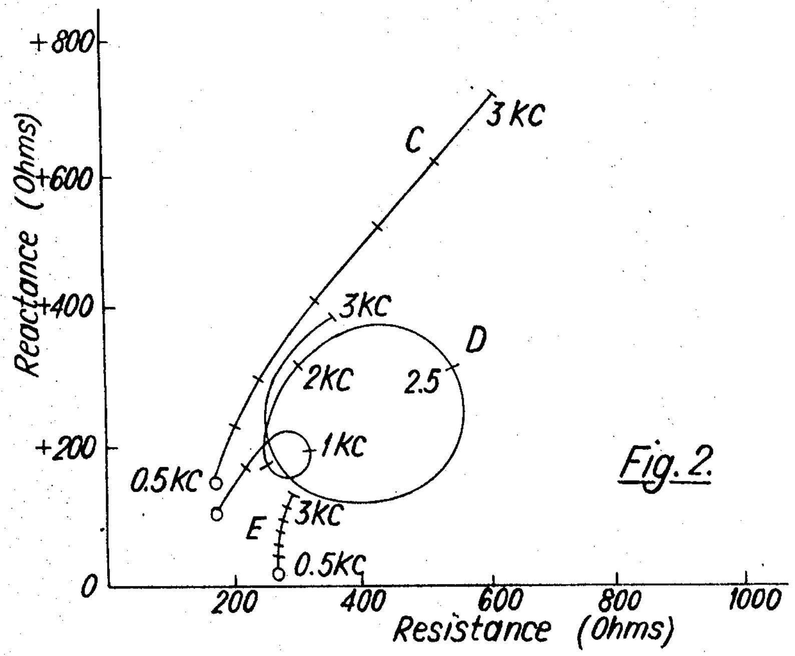
FIG. 2 shows the variation of impedance with frequency for a number of different handsets.

FIG. 2 shows the impedance of a moving iron receiver C, a rocking armature receiver D and a moving coil receiver E. Although the subset input impedance is a composite result of transmitter, receiver and balance network impedances, the positive reactance of the receiver is still strongly evident in the typical subset impedance curve F of FIG. 3.

Figure 3:
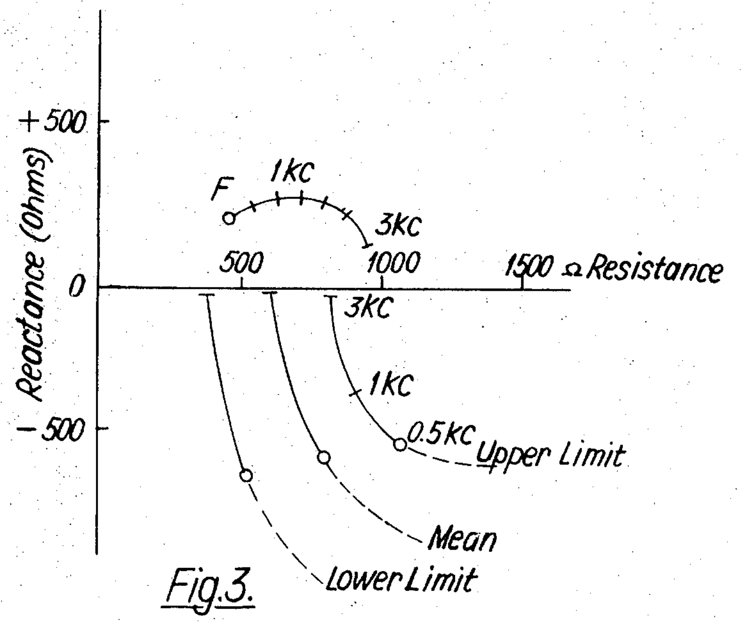
FIG. 3 shows a typical subset impedance curve and also the limits between which the subset impedance should lie for sufficiently close matching to give a 20 db. return loss for a particular length of local line.

Also shown on FIG. 3 are the limits between which the subset impedance must lie in order to give sufficiently close matching to result in 20 db. return loss for one particular length of local line. It is obvious that the positive reactive component of the receiver must be replaced by a negative reactive component.

Figures 4, 5:
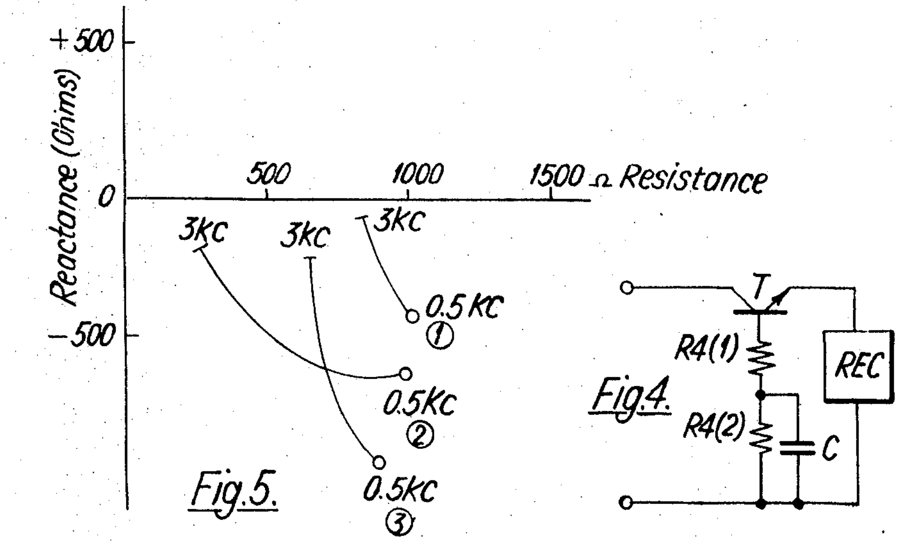
FIG. 4 is a circuit diagram showing a transistor T used as a buffer between a receiver and a line.
FIG. 5 shows the input impedance of the circuit of FIG. 4 for various values of the components R4(1), R4(2) and C of FIG. 4.

One simple way of doing this is to use a common-base connected transistor T as buffer between the receiver REC and the line as shown in FIG. 4. The input impedance of the circuit of FIG. 4 is determined by the impedance in the base lead of the transistor. The effect obtained with different arrangements of the resistance-capacitance network R4(1), R4(2) and C is shown in FIG. 5 curve (1) corresponding to $R4(1)=10^5$ ohms, $R4(2)=5\times10^5$ ohms, C=800 picofarads, curve (2) to $R4(1)=2\times10^4$ ohms, $R4(2)=5\times10^5$ ohms, C=400 picofarads, and curve (3) to $R4(1)=10^5$ ohms, $R4(2)=10^6$ ohms and C=500 picofarads. Curves (1), (2) and (3) show similar shapes to the line impedance curves of FIG. 1. The use of a common-base connected transistor as a buffer stage between the receiver and the line thus provides a suitable input impedance which is independent of the type of receiver used as the transistor load impedance.

The common-base method of connection gives a two-terminal arrangement with signal and power supply on the same input terminals, and allows the impedance of the base lead to be in the range 0.1 megohm to 1 megohm, giving an input impedance in the region of 1000 ohms, thus allowing existing photoresistors to be used as variable resistances controlled by line current in an automatic impedance and gain regulator.

Figure 6:
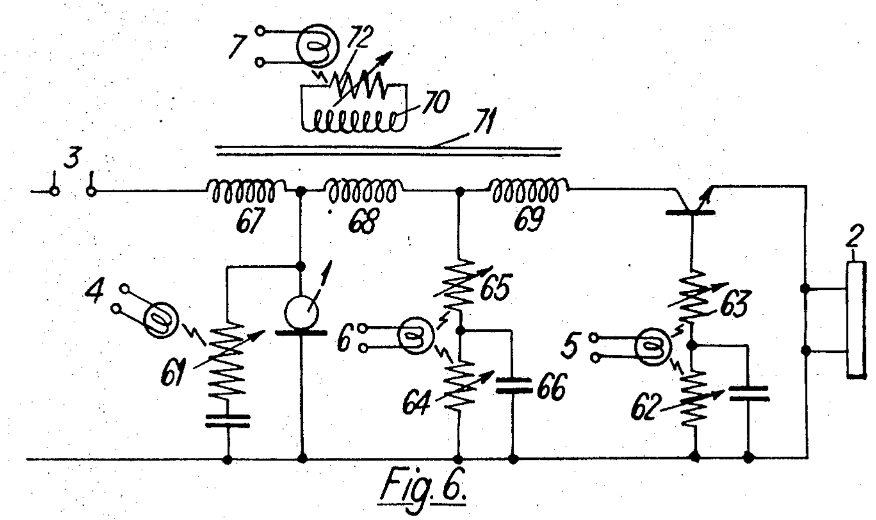
FIG. 6 is the circuit diagram of a subset which includes variable resistance elements, for example photoresistors.

The sensitivity of a subset and also its input impedance may be maintained automatically so that for different lengths of line between local exchange and subscribers'installations no manual adjustment is required to maintain good impedance match and constant signal level at the listener's ear, at both ends of the circuit by the method illustrated with reference to FIG. 6 in which a subscriber's set contains variable resistance elements therein. A variable resistance element 61 is included in the transmitter arm which also includes the transmitter capsule 1. Variable resistance elements 62 and 63 are included in the receiver arm which also includes the receiver capsule 2. Variable resistance elements 64 and 65 and a capacitor 66 make up a balance arm. Coil windings 67—70 and the core 71 form a side-tone suppression arm and 72 is a general shunt resistance. 61—65 and 72 are photosensitive devices whose resistivity is altered by incident light. A control signal is derived from the line at 3 and drives lamp 4 which alters resistance 61, lamp 5 which alters resistances 62 and 63, lamp 6 which alters resistances 64 and 65, and lamp 7 which alters the general shunt resistance 72. (The four lamps may, depending on the design of the handset and the layout of the arms therein, be formed by one suitably shaded bulb.)

The variable resistances and some of the capacitors and fixed resistors (not shown) in the set can be formed as integrated circuit elements on a single plate.

The controlling illumination is derived from the line current so that as line current increases all the resistances become smaller, reducing the sensitivity of the set and changing its input impedance so as to maintain a match with the line impedance and changing the balance arm impedance to maintain low power transfer from the transmitter arm to the receiver arm.

As an alternative to photosensitive devices, the variable resistances 61—66 could be the conductive channels of field effect transistors and control could be by electrostatic means driven by the line current so as to apply a bias to the field effect transistors.

Figure 7:
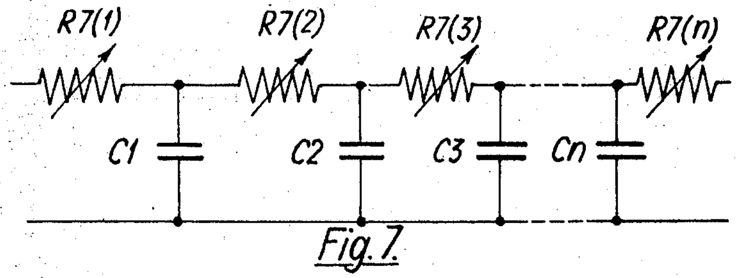
FIG. 7 is a schematic diagram of a ladder network which is added to a subscriber's subset so as to bring the value of the impedance presented to the set by a short line up to the value of the impedance presented by a long line.
Figure 8:
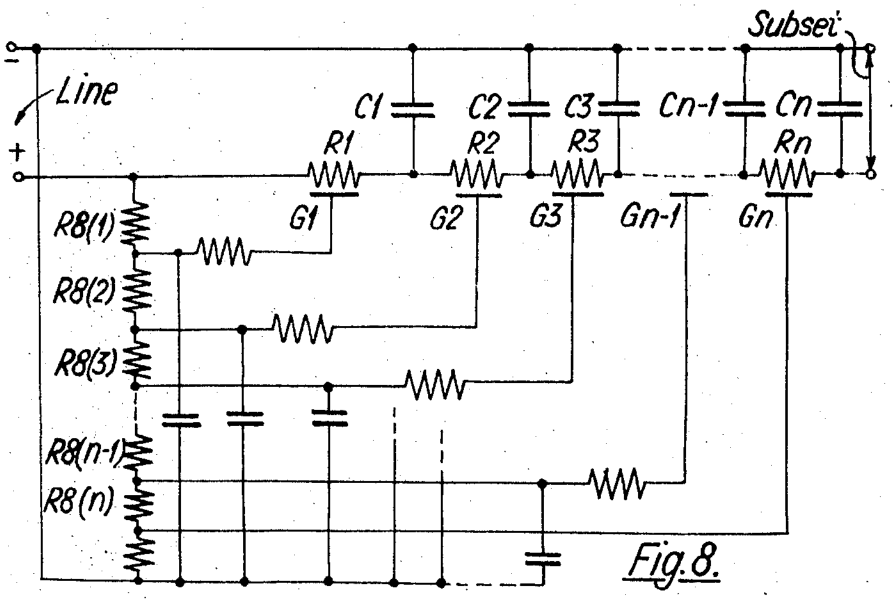
FIG. 8 is a circuit diagram showing in greater detail the realization of the arrangement of FIG. 7.

In the third preferred embodiment, which is illustrated in FIGS. 7—8, instead of altering the subset to match a variable line, a variable pad is added to all lines to give constant signal and the same line impedance at all subscribers'locations. The adjustments are automatic, being controlled by the line length.

The telephone line in a local network (up to, say, 5 km.) can be closely simulated by a ladder network of series resistances and shunt capacities, so that the impedance presented to a subscribers' set by a short line can be made equal to that of a long line by adding a ladder network of the form shown in FIG. 7, consisting of R1, R2, R3, R4 etc. and C1, C2, C3, C4 etc. If R1, R2 etc. are conducting layers whose resistance is varied by electrostatic fields controlled by the voltage available at the subscriber's end of the line, in such a manner that resistance falls as voltage falls, then the impedance added by the pad will vary inversely as the length of the exchange line. Also the attenuation of the line plus pad will be constant with line length. Thus the subscriber's set will not need to have regulation of sensitivity or input impedance.

FIG. 8 shows the pad in greater detail. The resistance R1, R2 etc. are the effective resistance values of the conductive channels formed between the source and drain regions of a field effect transistor when a proper biasing potential is applied to its gate electrode and their controlling gates G1, G2, G3 biased are biassed from a potential divider R8(1), R8(2), R8(3) etc. of high resistance compared to line impedance. The resistances in series with the gate are of the order of 1 megohm and shunt capacitors prevent signal voltages reaching the gates, C1, C2, C3 etc. are of such values that when R1 — R$n$ are at their maxima the ladder network is a close simulation of a long line.

In the arrangement of FIGS. 7—8, all the resistors, capacitors and field effect devices can be formed on the same plate by integrated circuit techniques.

It is to be understood that the foregoing description of specific examples of this invention is made by way of example only and is not to be considered as a limitation on its scope.

I claim:

1. An arrangement including a telephone subset, a line, and variable impedance means coupling said line to said subset for matching the impedance of said line with the impedance of said subset, said subset including at least a receiver, said variable impedance means comprising:

a transistor having an emitter, base and collector terminal, the collector and emitter terminals connected respectively to said line and said receiver;

a variable resistance device connected to the base terminal of said transistor; and a control signal derived from current flowing through said line, said control signal being coupled to said variable resistance device to alter the resistance value of said device.

2. An arrangement according to claim 1, wherein said variable resistance device further comprises:

a photoresistor; and a lamp for radiating incident light onto said photoresistor, said control signal being coupled to said lamp to vary the intensity of the light radiated so as to alter the resistance of said photoresistor.